United States Patent Office 2,998,082
Patented Aug. 29, 1961

2,998,082
POWER-DRIVEN CULTIVATING TOOLS
Alfred Erwin Reginald Arnot, Basingstoke, England, assignor to J. E. Shay Limited, Basingstoke, England, a British company
Filed Dec. 8, 1958, Ser. No. 778,825
Claims priority, application Great Britain Dec. 9, 1957
3 Claims. (Cl. 172—125)

This invention comprises improvements in or relating to power-driven cultivating tools.

It is known in power-driven cultivating tools to mount rotary cultivators on a horizontal shaft which is provided with a worm wheel and driven from a motor through a drive shaft provided with a worm and to arrange a gear-box in which the worm-gear and the cultivator shaft are located so that the gear box and the shaft can be swung about the axis of the worm to bring the cultivator shaft into an inclined or vertical position in which other forms of cultivators or scythe blades or the like can be mounted upon it, thus increasing the adaptability of the tool.

It is a feature of this invention to provide in power-driven cultivating tools of the kind described, an auxiliary power take-off on the gear-box which drives the cultivator shaft, driven by a rotating member on the gear-box, which can be used for operating various accessories.

It is a disadvantage of the known construction that a worm-drive is unsymmetrical and therefore when the worm-casing is rotated about the axis of the worm to bring the shaft into an inclined or upright position, the shaft is simultaneously displaced to one side or the other of the machine. It is an object of the present invention to provide an auxiliary drive connection and overcome the problem of providing a symmetrical reduction-gear with an adequate reduction ratio, without undue complication of the parts.

According to the present invention in a power-driven cultivator a cultivator shaft is provided which is supported in a gear-box in such a position that the axis of the shaft intersects or extends adjacent to the axis of a drive-shaft disposed transversely to it, the gear-box being made adjustable around the axis of the drive-shaft, and the cultivator shaft being connected to the drive-shaft through an intermediate worm-shaft intersecting the axis of the drive shaft and carrying a bevel-wheel to mesh with a bevel-wheel on the drive shaft.

The worm-shaft need not necessarily be at right-angles to the axis of the drive-shaft which it intersects; indeed preferably the worm-shaft rotates about an axis which, in one position adjustment of the gear-box is vertical when the drive-shaft is inclined downwardly from the motor. The downward inclination of the drive-shaft is the normal working position and the said difference of angle from a right-angle is easily provided for by appropriately shaping the bevel-wheels which connect the two shafts together.

There may be a removable cover on the gear-box over the worm-shaft at one end thereof and, if so, that end of the worm-shaft is provided with means to afford a power take-off.

The following is a description by way of example of one construction of cultivator machine in accordance with the invention:

Referring to the accompanying drawings.

Figure 2:
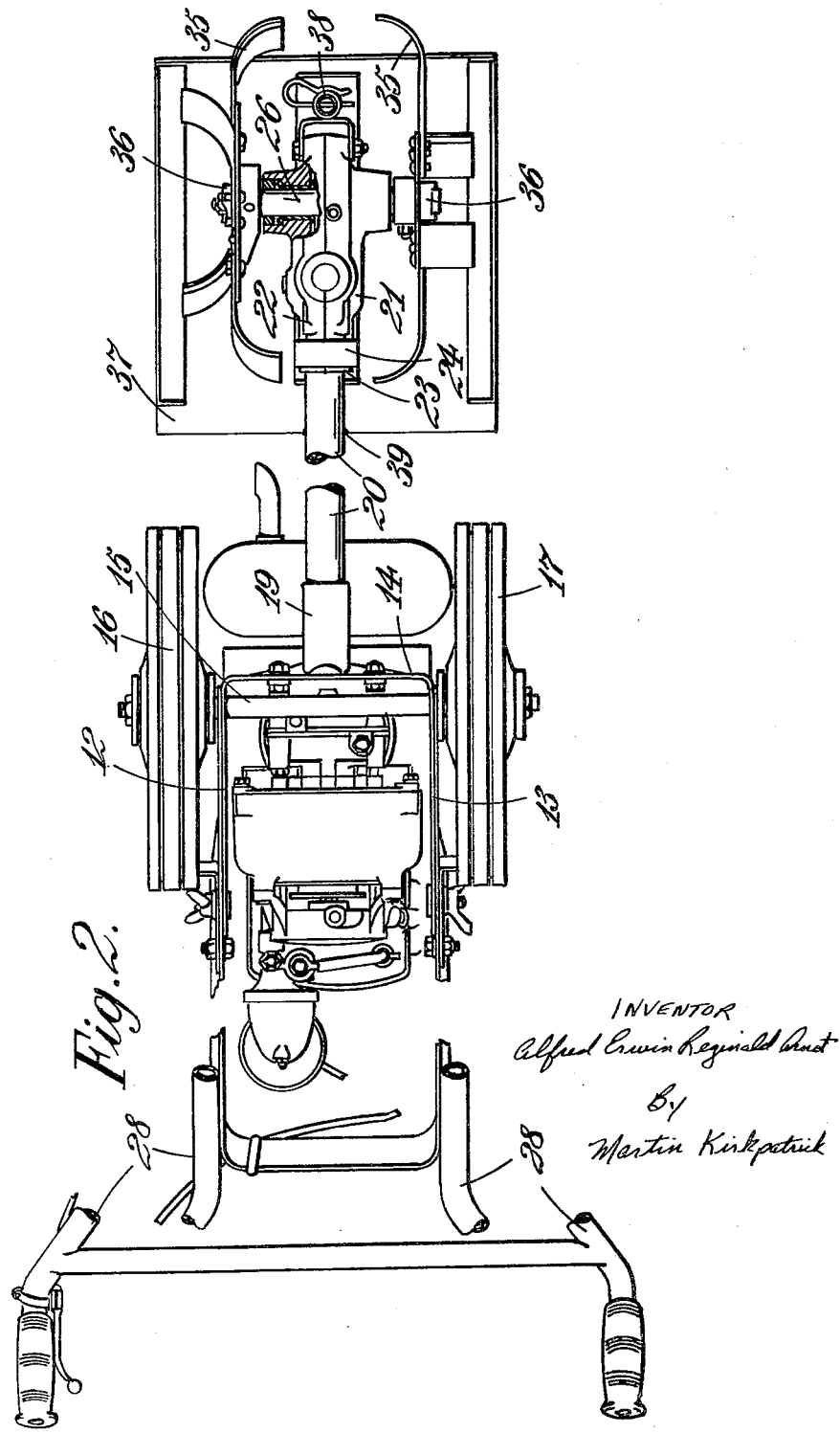
FIGURE 2 is an underside plan of the same.

A petrol driving motor 11 is mounted on a frame which comprises two side plates 12, 13 (FIGURE 2) connected together by a front cross plate 14, the side plates being supported on a horizontal axle 15, which carries two ground wheels 16, 17 outside the side plates. When the machine is in its normal working position the petrol motor 11 drives a hollow operating shaft 18 which extends forwardly and in a slightly inclined direction downwardly from the front plate 14 of the frame and which passes through a tubular member 19 concentric with it and joined to the front frame plate. The forwardly-projecting tube 19 forms a socket to receive a casing tube 20 which may be about 18 inches in length and which at its front end enters a gear-box formed in two halves 21, 22. The gear-box has a socket portion 23 which surrounds the tube 20 and which is split longitudinally to make it compressible. It carries a collar 24 and clamping bolt 25 which extends tangentially to the tubular casing member 20 and is capable of tightening the gear-box on the tube by contracting the slit in the gear-box. Thus, if the bolt 25 is slacked off, the gear-box can be rotated about the tube 20 to any desired angle and clamped wherever it is set by tightening bolt 25 again.

Figure 1:
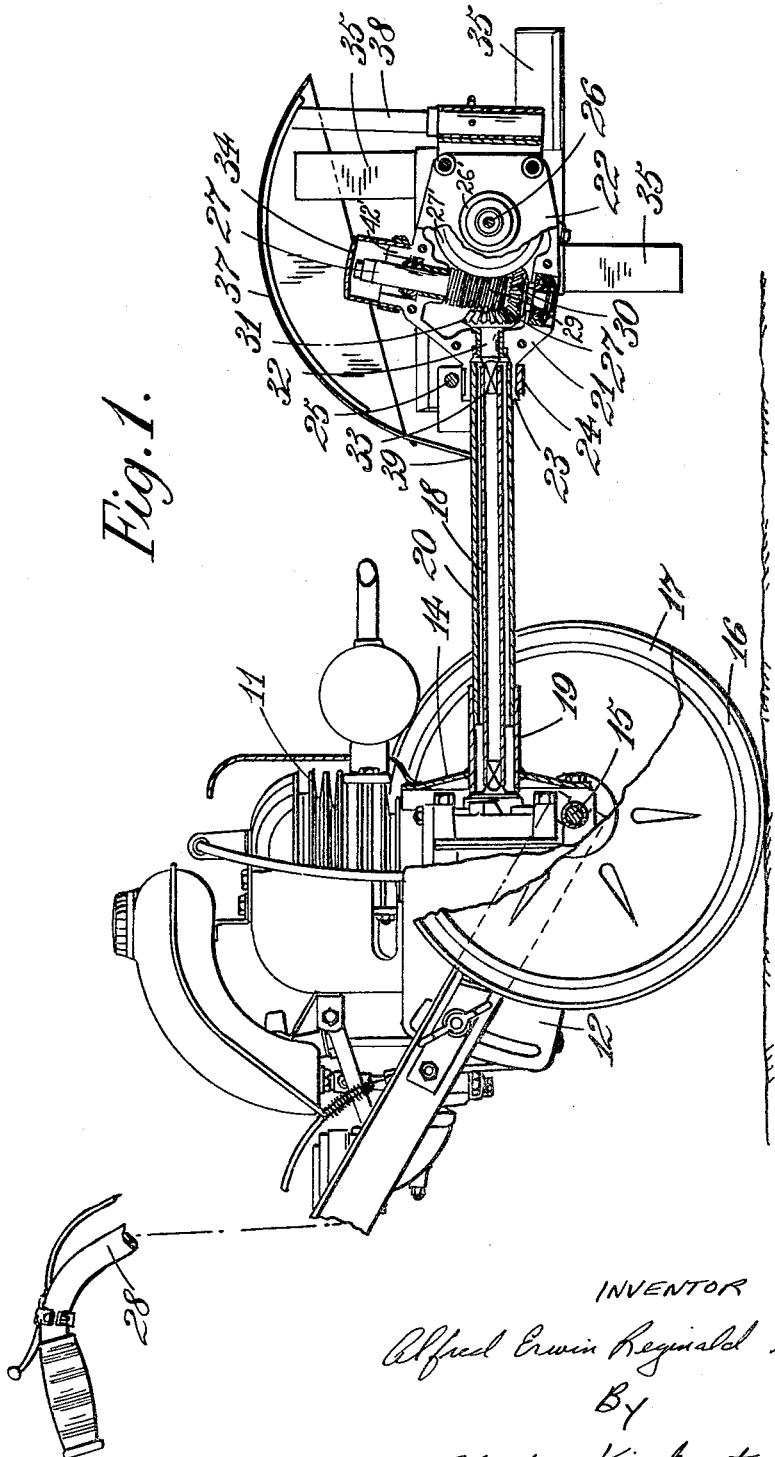
FIGURE 1 is a side elevation of a cultivator in accordance with the invention, with parts broken away to show the gearing in vertical section.
Figure 3:
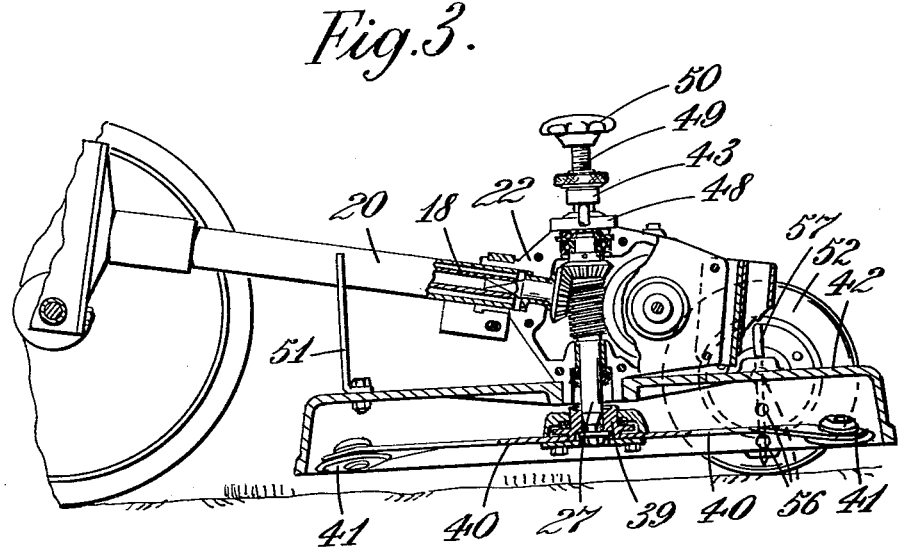
FIGURE 3 is a side elevation, partly in section, with a grass-cutting attachment fitted.
Figure 4:
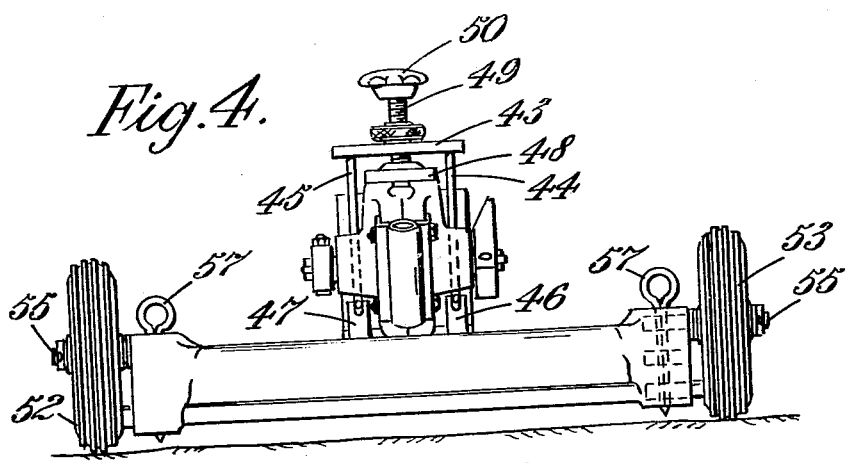
FIGURE 4 is a front end elevation of the parts shown in FIGURE 3.
Figure 5:
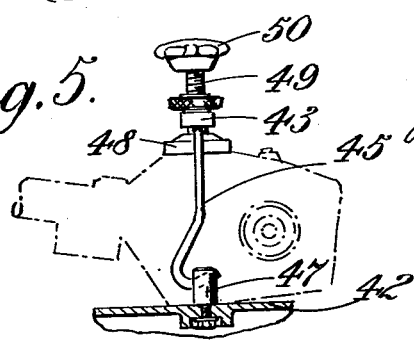
FIGURE 5 is a detail of the cover holding arrangement.

In the normal position of the gear box 21, 22 shown in FIGURE 1, a cultivator shaft 26 passes through the gear-box from side to side horizontally. The cultivator shaft 26 is supported in anti-friction bearings 26′ in the gear-box and its axis intersects the axis of the drive-shaft 18. On the cultivator shaft 26 within the gear-box 21, 22 is a worm-wheel 27′ and meshing with the worm-wheel and also intersecting the axis of the drive-shaft is a worm-shaft 27 extending at a small angle to the vertical direction in FIG. 1. It will be understood that the whole apparatus can be canted up and down about the ground wheels 16, 17 already referred to, and in order to govern its movements a handle 28 is affixed to the side plates 12, 13 of the frame and extends rearwardly therefrom. The angle of the worm-shaft 27 as viewed in FIGURE 1 is such that if the handle is raised to cant the tube 20 downward to its normal operating inclination, and the gear-box 21, 22 is inverted, the shaft 27 will become vertical, as shown in FIGURE 3.

The worm-shaft 27 carries a worm 29 which meshes with the worm-wheel of the cultivator shaft and it also carries near its lower end a bevel-wheel 30 which meshes with a bevel-wheel 31 on a stub-shaft 32, journaled on the gear-box 21, 22 and having a square 33 to fit into a square socket formed on the front end of the hollow drive-shaft 18. Both the bevels 30, 31 and the worm-gear 27 are enclosed in the gear casing 21, 22 and are immersed in oil in the casing. Appropriate oil seals are provided.

The cultivator shaft 26 extends outside the gear-box 21, 22 on each side and cultivator tines 35 secured to hubs 36 are secured to its ends. A guard 37 is fixed around the upper part of the path of the tines by a bracket 38 in front and a connection at 39 to the tube 20 at the rear of the tines.

Adjacent the upper end of the worm-shaft there is a removable cover 34 to the casing and the worm-shaft 27 is adapted to afford a driving connection for power take-off. By these means, the end of the shaft 27 can be used as a power take-off connection for driving, say, a rotatable grass cutting scythe, after the cultivator tines have been removed, and the gear-box inverted, as shown in FIGURE 3.

As will be seen, in FIGURE 3 the gear-box 21, 22 is inverted and the shaft 27 is vertical. At its lower end, on the power take-off there is secured a rotor 39 which carries scythe arms 40, on which are secured cutter blades 41. Above the blades 41 is a cover 42 the center of which is bored to fit the spigot 42′ on the gear-box previously fitted by the cover 34. The cover is held on to the spigot by a cross-bar 43 and hooks 44, 45 which engage lugs 46, 47 on the cover. The center of the cross-bar overlies the gear-box and a pad 48 on the lower end of a screw 49 bears on the gear-box and can be tightened up by means of a hand-wheel 50. A bracket 51 helps to keep the parts from canting, by engaging the underside of tube 20, and land-wheels 52, 53 serve to keep the parts at a suitable height from the ground. The wheel axles 55 can be adjusted for height by inserting them into any one of a series of holes 56 drilled at varying heights in the sides of the cover 42. The axles are secured in place by split pins 57.

Also, with the tines 35 removed, the gear casing 21, 22 can be so set that the free end of the worm-shaft extends upwardly as shown in FIGURE 1 and in this position it can be used to operate, say, a pump for spraying purposes or a hedge trimmer through a flexible power drive connection.

When the cultivator shaft is in the normal horizontal position, and the rotary cultivator tines 35 attached to it on either side of the gear-box, these can be operated for cultivating the soil in known manner. The weight of the parts is balanced to a large extent about the ground wheels 16, 17 and the operator can regulate the depth of cultivation by the handle 28.

I claim:
1. A power-driven cultivator including a driving motor, a wheeled frame to support said motor, a drive shaft extending generally forwardly from said wheeled frame, said drive shaft being operatively connected to said motor, a driving bevel gear mounted on the driving end of said drive shaft for rotation thereby, a tubular member disposed concentrically about said drive shaft, said tubular member being rigidly joined to said frame, a housing attached to the end of said tubular member remote from said frame, said housing being adapted for rotation into selected angular positions with respect to said tubular member, a first power shaft carried by said housing for rotation with respect thereto, said first power shaft being adapted to serve optionally as a source of output power for operating power machinery, a driven bevel gear rigidly mounted on said first power shaft to mesh with said driving bevel gear, a worm gear rigidly mounted on said first power shaft adjacent said driven bevel gear, a second power shaft carried by said housing for rotation with respect thereto and disposed so that the axis of the second power shaft intersects the axis of the drive shaft, a worm wheel rigidly mounted on said second power shaft to mesh with said worm gear and a detachable cultivating attachment adapted to be directly driven by said second power shaft through said first power shaft when the latter is not otherwise engaged.

2. A power-driven cultivator as claimed in claim 1 wherein in one selected angular position of the housing the said first power shaft is vertical when the drive shaft is inclined downwardly from the motor.

3. A power-driven cultivator as claimed in claim 2 wherein one end of the first power shaft is adapted to serve optionally as a source of output power for operating power machinery, and a removable cover is provided to cover said end when it is not being used as a source of output power.

References Cited in the file of this patent

UNITED STATES PATENTS

| | | |
|---|---|---|
| 2,412,704 | Jaques | Dec. 17, 1946 |
| 2,428,973 | Kelsey | Oct. 14, 1947 |
| 2,461,188 | Stoner | Feb. 8, 1949 |
| 2,580,721 | Beccard | Jan. 1, 1952 |
| 2,634,770 | Mall | Apr. 14, 1953 |
| 2,736,350 | Hill et al. | Feb. 28, 1956 |
| 2,817,205 | Muller | Dec. 24, 1957 |

FOREIGN PATENTS

| | | |
|---|---|---|
| 803,111 | Great Britain | July 29, 1955 |